United States Patent
Kobayashi

(10) Patent No.: US 11,506,120 B2
(45) Date of Patent: Nov. 22, 2022

(54) METHOD FOR MANUFACTURING AND UTILIZING HIGH-DENSITY AIR

(71) Applicant: Takaitsu Kobayashi, Chiba (JP)

(72) Inventor: Takaitsu Kobayashi, Chiba (JP)

( * ) Notice: Subject to any disclaimer, the term of this patent is extended or adjusted under 35 U.S.C. 154(b) by 326 days.

(21) Appl. No.: 15/572,629

(22) PCT Filed: Jan. 13, 2016

(86) PCT No.: PCT/JP2016/050818
§ 371 (c)(1),
(2) Date: Nov. 8, 2017

(87) PCT Pub. No.: WO2016/181664
PCT Pub. Date: Nov. 17, 2016

(65) Prior Publication Data
US 2018/0104658 A1    Apr. 19, 2018

(30) Foreign Application Priority Data

May 13, 2015   (JP) .............................. JP2015-098523

(51) Int. Cl.
*F02C 3/30*       (2006.01)
*F02C 3/22*       (2006.01)

(52) U.S. Cl.
CPC .   *F02C 3/22* (2013.01); *F02C 3/30* (2013.01)

(58) Field of Classification Search
CPC .......... B01F 3/04; F02B 29/0481; F02C 3/22; F02C 3/30; F02M 25/025; F02M 25/028;
(Continued)

(56) References Cited

U.S. PATENT DOCUMENTS

| | | | | |
|---|---|---|---|---|
| 5,743,080 A | * | 4/1998 | Ginter | .................. F01K 21/047 203/11 |
| 2002/0046561 A1 | * | 4/2002 | Bronicki | ............... F01K 23/067 60/39.182 |

(Continued)

FOREIGN PATENT DOCUMENTS

| | | |
|---|---|---|
| JP | 2000-34930 | 2/2000 |
| JP | 2007-162485 | 6/2007 |

(Continued)

OTHER PUBLICATIONS

International Search Report dated Mar. 15, 2016 in International Application No. PCT/JP2016/050818.

*Primary Examiner* — Ehud Gartenberg
*Assistant Examiner* — Henry Ng
(74) *Attorney, Agent, or Firm* — Wenderoth, Lind & Ponack, L.L.P.

(57) ABSTRACT

Provided is a method for enabling high-density air to be efficiently manufactured without unnecessarily increasing the pressure and temperature. A method for manufacturing high-density air according to the present invention includes: mixing raw air A with fine water particles W to generate water-containing air A1 having a lower pressure than the raw air A; supplementing the water-containing air A1 with a differential pressure between the pressure of the raw air A and the pressure of the water-containing air A1; and consequently promoting vaporization of the fine water particles W in the water-containing air A1 and reducing the volume of the water-containing air A1 to manufacture high-density air A2. The density of air can be efficiently increased with this method.

6 Claims, 2 Drawing Sheets

(58) Field of Classification Search
CPC .... F02M 25/032; F02M 25/035; F02M 33/00; F04B 39/06; F23L 7/002; Y02T 10/121; Y02T 10/146

See application file for complete search history.

(56) References Cited

U.S. PATENT DOCUMENTS

| | | | |
|---|---|---|---|
| 2002/0092286 A1* | 7/2002 | Hatamiya | F02C 3/30 60/39.3 |
| 2006/0107646 A1* | 5/2006 | Hatamiya | F02C 3/30 60/39.53 |
| 2010/0288976 A1 | 11/2010 | Davidian | |
| 2011/0079015 A1* | 4/2011 | Geis | F01D 17/02 60/779 |
| 2012/0180496 A1* | 7/2012 | Fletcher | F02C 3/30 60/775 |
| 2013/0192193 A1* | 8/2013 | Yoshida | F01K 23/10 60/39.182 |
| 2013/0318973 A1* | 12/2013 | Takahashi | F04D 29/5846 60/726 |
| 2014/0013757 A1* | 1/2014 | Eguchi | F02C 1/05 60/728 |
| 2015/0345386 A1* | 12/2015 | Nakamoto | F01K 23/10 60/801 |
| 2018/0066662 A1* | 3/2018 | Takahashi | F04D 19/02 |

FOREIGN PATENT DOCUMENTS

| | | |
|---|---|---|
| JP | 2009-191635 | 8/2009 |
| JP | 2011-504447 | 2/2011 |
| JP | 2015-90090 | 5/2015 |

\* cited by examiner

METHOD FOR MANUFACTURING AND UTILIZING HIGH-DENSITY AIR

TECHNICAL FIELD

The present invention relates to a method for manufacturing high-density air and a method for utilizing high-density air manufactured with the method.

BACKGROUND ART

Conventionally, as a method for increasing the density of gas such as air, a method for forcibly compressing the gas using a compression device such as a compressor is already known. With this method, heat is generated as the gas is compressed, and a large load is applied to the compression device.

Patent Literature 1 below relates to a method for forcibly compressing air using a compression device, and discloses a method for reducing the load on the compression device by using a water circulating air compression machine as the compression device and cooling the compression device itself with circulating water.

Patent Literature 2 below relates to a method for forcibly compressing synthesis gas using a compression device, and discloses a method for reducing the load on the compression device by using, as the compression device, a thermodynamic compressor capable of simultaneously compressing and cooling the synthesis gas, directly injecting water as a coolant into the thermodynamic compressor, and compressing the synthesis gas while cooling the synthesis gas.

CITATION LIST

Patent Literature

Patent Literature 1: JP 2007-162485 A
Patent Literature 2: JP 2011-504447 W

SUMMARY OF INVENTION

Technical Problem

However, the methods of Patent Literature 1 and Patent Literature 2 above are inefficient because the thermal energy obtained, by the gas through the forcible compression is partially lost during the cooling process.

Solution to Problem

The present invention provides a method for efficiently manufacturing high-density air in which the step of forcibly compressing raw air is eliminated, and provides a method for effectively utilizing the energy of the high-density air manufactured with the method.

In short, a method for manufacturing high-density air according to the present invention includes: mixing raw air with fine water particles to generate water-containing air having a lower pressure than the raw air; supplementing the water-containing air with a differential pressure between the pressure of the raw air and the pressure of the water-containing air; and consequently promoting vaporization of the fine water particles in the water-containing air and reducing the volume of the water-containing air to manufacture high-density air. With this method, high-density air can be efficiently manufactured without unnecessarily increasing the pressure and temperature.

Preferably, a blower machine or a compressor is used as a means for supplementing the pressure of the water-containing air.

In addition, a method for utilizing high-density air manufactured with the method for manufacturing high-density air according to the present invention includes utilizing, as an operating gas for an external combustion engine, the high-density air together with steam having a higher pressure than the high-density air. The high-density air and the steam are simultaneously applied to the external combustion engine, or the high-density air and the steam are applied to the external combustion engine at a time interval, so that the high-density air can effectively operate the external combustion engine while appropriately receiving the thermal energy of the high-pressure steam.

Alternatively, the high-density air manufactured with the method for manufacturing high-density air according to the present invention is utilized as a combustion supporting gas for an internal combustion engine in order to effectively utilize the high-density air densely containing a lot of oxygen.

Advantageous Effects of Invention

The method for manufacturing high-density air according to the present invention enables the density of air to be efficiently increased.

Further, the method for utilizing high-density air according to the present invention enables the high-density air to be effectively applied to an external combustion engine or an internal combustion engine.

DESCRIPTION OF EMBODIMENTS

The best mode for carrying out the present invention will be described below with reference to FIGS. 1 and 2.

Figure 1:
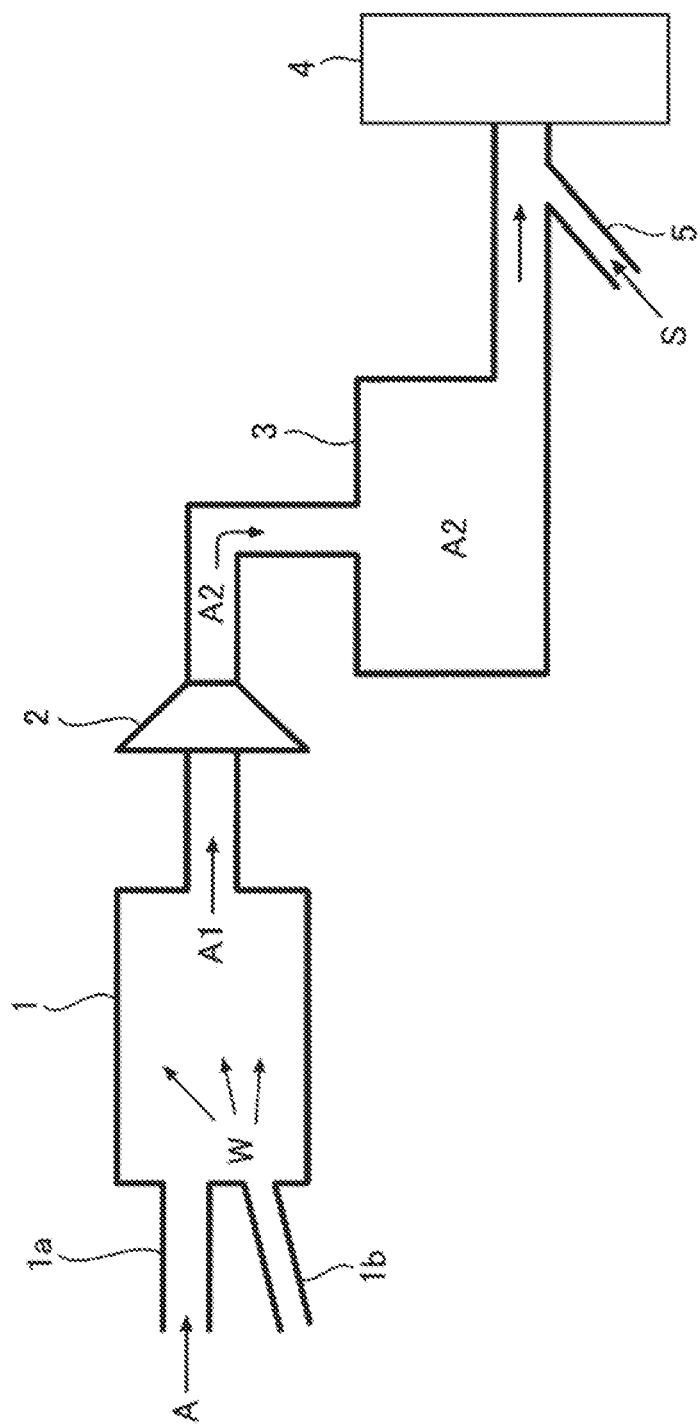
FIG. 1 is a schematic diagram illustrating a basic configuration example of a device for manufacturing high-density air according to the present invention.
Figure 2:
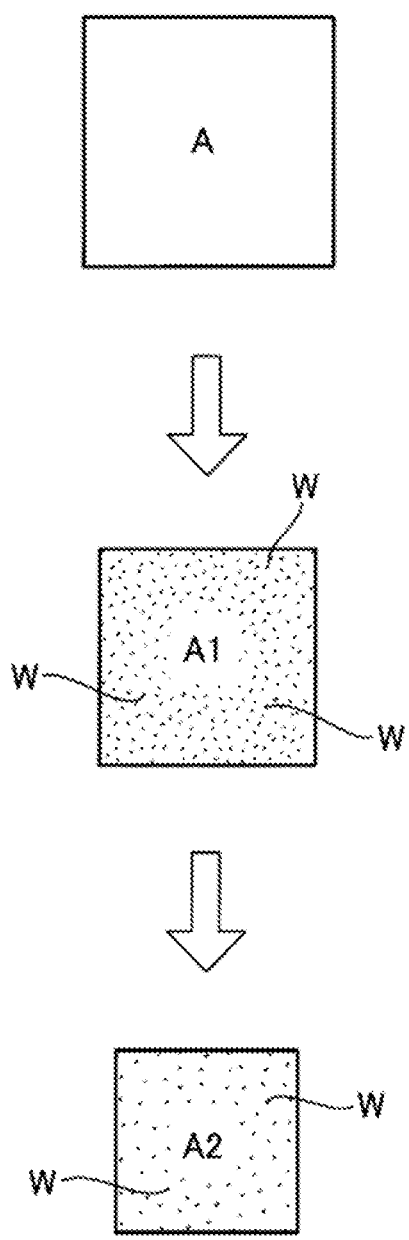
FIG. 2 is a conceptual diagram of raw air, water-containing air, and high-density air.

In a method for manufacturing high-density air according to the present invention, as illustrated in FIG. 1, first, a desired amount of raw air A is supplied into a water-containing air generating means 1 having a sealed space via an air supply means 1a. Next, a large number of fine water particles W are injected to the supplied raw air A through a fine water particle supply means 1b having a jet port such as a nozzle, and the raw air A is mixed with the fine water particles W.

As used in the present invention, the raw air A is preferably air having normal temperature and pressure such as the atmosphere. However, the temperature and pressure of the raw air A can be freely selected and appropriately adjusted in accordance with the implementation of the present invention. Each of the fine water particles W is as fine a water particle (small droplet) as possible in order to increase the surface area, and the particle diameter, temperature, and amount of supply of the fine water particles W are appropriately adjusted, for example, in accordance with the temperature, pressure, and amount of supply of the raw air A.

As described above, water-containing air A1 is generated by mixing the raw air A with the fine water particles W in the water-containing air generating means 1. Specifically, a large number of fine water W mixed in the raw air A are in gas-liquid contact with the raw air A and present in the raw air A while taking the heat of the raw air A. In the present invention, the air containing a large number of fine water particles W is referred to as the water-containing air A1.

In other words, the fine water particles W are present in the raw air A while holding the heat taken from the raw air A as latent heat of vaporization. Note that the present invention does not exclude a case where part of the fine water particles W in the water-containing air A1 is vaporized into wet steam.

As described above, the temperature of the water-containing air A1 is rower than that of the raw air A, and accordingly the pressure of the water-containing air A1 is lower than that of the raw air A. As illustrated in FIG. 2, the volume of the water-containing air A1 is also smaller than that of the raw air A.

Specifically, assuming that the temperature, pressure, and volume of the raw air A are respectively denoted by T, P, and V (the same applies hereinafter), and the temperature, pressure, and volume of the water-containing air A1 are respectively denoted by T1, P1, and V1 (the same applies hereinafter), then the relations T>T1, P>P1, and V>V1 are satisfied with regard to the temperature, pressure, and volume, respectively.

Next, as illustrated in FIG. 1, the water-containing air A1 passes through a differential pressure supplementing means 2 to be supplemented with a difference in pressure between the raw air A and the water-containing air A1, i.e., a differential pressure (P1−P) between the pressure P of the raw air A and the pressure P1 of the water-containing air A1, whereby high-density air A2 is manufactured. Since the water-containing air A1 is pressurized to the original pressure P of the raw air A, the generation of heat can be suppressed to a great extent in this case, as compared with a case where the forcible compression is performed, that is, where the raw air A is pressurized to a pressure higher than its original pressure P. In this case, the suppression of heat generation is also achieved through the vaporization of the fine water particles W in the water-containing air A1.

An already known blower machine such as a pressure fan, a fan, and a blower, or an already known known compressor is used as the differential pressure supplementing means 2 to supplement the water-containing air A1 with the differential pressure and transfer the high-density air A2 to a storage means 3 such as a tank. In particular, the blower machine can efficiently supplement the water-containing air A1 with the differential pressure and transfer the high-density air A2 when used as the differential pressure supplementing means 2.

The temperature and pressure of the manufactured high-density air A2 are higher than those of the water-containing air A1, promoting the vaporization of the fine water particles W. Accordingly, as illustrated in FIG. 2, the volume of the high-density air A2 is smaller than that of the water-containing air A1, whereas the pressure of the high-density air A2 is equal to that of the raw air A.

Specifically, assuming that the temperature, pressure, and volume of the high-density air A2 are respectively denoted by T2, P2, and V2 (the same applies hereinafter), then the relations T2>T1, P−P2>P1, and V>V1>V2 are satisfied with regard to the temperature, pressure, and volume, respectively. The temperature T of the raw air A is equal to the temperature T2 of the high-density air A2, or one of the temperatures T and T2 is higher than the other, depending on the amount of contained fine water particles the amount of vaporized fine-water particles W, and the like.

As described later, the high-density air A2 manufactured in the above-mentioned manner is supplied for utilization from the storage means 3 to an external combustion engine or an internal combustion engine serving as a heat engine 4.

Next, a method for utilizing high-density air according to the present invention will be described.

First, a case where the high-density air A2 manufactured as described above is utilized as an operating gas for an external combustion engine serving as the heat engine 4 will be described. Examples of the external combustion engine include a turbine having an external combustion structure such as an already known steam turbine, an already known free piston, an already known rotary, and the like.

In this case, the high-density air A2 may be utilized as it is as the operating gas, but preferably it is used together with steam S having a higher pressure than the high-density air A2.

Specifically, as illustrated in FIG. 1, in a case where the heat engine 4 is an external combustion engine, the high-density air A2 supplied to the external combustion engine 4 together with the steam S that is supplied via a steam supply means 5.

The high-density air A2 and the steam S are simultaneously applied to the external combustion engine 4.

Alternatively, the high-density air A2 and the steam S are applied to the external combustion engine 4 at a time interval. More specifically, after the operation of the external combustion engine 4 is started by one of the high-density air A2 and the steam S, the other gas is supplied to continue the operation of the external combustion engine 4. Consequently, it is possible to smoothly supply the subsequent gas (the other gas) at a relatively low supply pressure.

For example, when one gas is supplied, the supply of the other gas is stopped, and when the other gas is supplied, the supply of the one gas is stopped. Alternatively, the supply end of one gas and the supply start of the other gas are synchronized with each other.

Since the high-density air A2 is a gas that does not condense at the condensation point of the steam S or gas that does not condense at the solidification point of the steam S, the high-density air A2 recovers the heat of condensation or heat of solidification released by the steam S, and inflates itself through the heat recovery to apply its gas pressure to the external combustion engine 4. Therefore, the high-density air A2 can effectively operate the external combustion engine 4 while appropriately receiving the thermal energy of the steam S.

Note that the present invention does not exclude a case where the temperature, humidity, and pressure of the high-density air adjusted as necessary for the utilization of the high-density air A2 as the operating gas for the external combustion engine 4.

Next, a case where the manufactured high-density air A2 is utilized as a combustion supporting gas for an internal combustion engine serving as the heat engine 4 will be described. Examples of the internal combustion engine include a turbine having an internal combustion structure such as an already known gas steam turbine, an engine such as already known hydrogen, gasoline, and jet engines, and an already known boiler.

In this case, the high-density air A2 is supplied to the internal combustion engine 4, compressed by a cylinder or the like of the internal combustion engine 4, and utilized to enhance the fuel combustion efficiency. The high-density air A2 densely contains a lot of oxygen to effectively improve the combustion efficiency. The high-density air A2 also contains a large number of fine water particles W together with steam, and the fine water particles W are also vaporized into steam and applied to the internal combustion engine.

Note that the present invention does not exclude a case where the temperature, humidity, and pressure of the high-density air A2 are adjusted as necessary for the utilization of the high-density air A2 as the combustion supporting gas for the internal combustion engine 4.

As described above, the method for manufacturing high-density air according to the present invention includes mixing, the raw air A with the fine water particles W to produce the water-containing air A1 instead of forcibly compressing the raw air and supplementing the water-containing air A1 with the differential pressure (P−P1) between the pressure P1 of the water-containing air A1 and the pressure P of the raw air A. Consequently, it is possible to efficiently manufacture the high-density air A2 without unnecessarily increasing the temperature and pressure and thus without causing energy loss such as the loss of thermal energy due to the increase and subsequent decrease in the temperature.

In addition, if the high-density air A2 manufactured with the above method is utilized as the operating gas for the external combustion engine together with the steam S having a higher pressure than the high-density air A2, the external combustion engine can be effectively operated.

Further, if the high-density air A2 manufactured with the above method is utilized as the combustion supporting gas for the internal combustion engine, the combustion efficiency in the internal combustion engine can be effectively improved.

REFERENCE SIGNS LIST 1 water-containing air generating means
1a air supply means
1b fine water particle supply means
2 differential pressure supplementing means (blower machine or compressor)
3 storage means
4 heat engine (external combustion engine or internal combustion engine)
5 steam: supply means
A raw air
A1 water-containing air
A2 high-density air
W fine water particles
S steam.

The invention claimed is:

1. A method for utilizing, as an operating gas for an external combustion engine, high-density air manufactured by:
   (a) supplying raw air into a water-containing air generator having a sealed space;
   (b) mixing the raw air with fine water particles to generate water-containing air having a pressure which is lower than a pressure of the raw air;
   (c) supplementing the water-containing air with a differential pressure between the pressure of the raw air and the pressure of the water-containing air; and
   (d) consequently promoting vaporization of the fine water particles in the water-containing air and reducing a volume of the water-containing air to manufacture the high-density air.

2. The method according to claim 1, wherein a blower machine is used for supplementing the pressure of the water-containing air.

3. The method according to claim 1, wherein a compressor is used for supplementing the pressure of the water-containing air.

4. The method according to claim 1, wherein the high-density air and steam are simultaneously applied to the external combustion engine.

5. The method according to claim 1, wherein the high-density air and steam are applied to the external combustion engine at different times.

6. A method for utilizing, as a combustion supporting gas for an internal combustion engine, high-density air manufactured by:
   (a) supplying raw air into a water-containing air generator having a sealed space;
   (b) mixing the raw air with fine water particles to generate water-containing air having a pressure which is lower than a pressure of the raw air;
   (c) supplementing the water-containing air with a differential pressure between the pressure of the raw air and the pressure of the water-containing air; and
   (d) consequently promoting vaporization of the fine water particles in the water-containing air and reducing a volume of the water-containing air to manufacture the high-density air.

* * * * *